United States Patent
Yamada (10) Patent No.: US 7,471,718 B2
(45) Date of Patent: Dec. 30, 2008

(54) CIRCUIT FOR FOLLOWING UP SYNCHRONIZATION OF A SPREAD-CODED SIGNAL BY POWER COMPARISON AND PHASE ADJUSTMENT

(75) Inventor: Kouji Yamada, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 678 days.

(21) Appl. No.: 11/142,261

(22) Filed: Jun. 2, 2005

(65) Prior Publication Data

US 2006/0039453 A1 Feb. 23, 2006

(30) Foreign Application Priority Data

Aug. 23, 2004 (JP) .............................. 2004-242442

(51) Int. Cl.
*H04B 1/00* (2006.01)
(52) U.S. Cl. .................... 375/150; 375/343; 375/355
(58) Field of Classification Search ................. 375/142, 375/145, 149–150, 343, 346, 365, 368, 354–355
See application file for complete search history.

(56) References Cited

U.S. PATENT DOCUMENTS

| | | | | |
|---|---|---|---|---|
| 5,654,991 A | * | 8/1997 | Andren et al. | 375/355 |
| 5,768,306 A | * | 6/1998 | Sawahashi et al. | 375/150 |
| 5,982,763 A | * | 11/1999 | Sato | 370/342 |
| 6,047,017 A | * | 4/2000 | Cahn et al. | 375/148 |
| 6,370,134 B1 | * | 4/2002 | Aramaki | 370/342 |
| 6,643,320 B1 | * | 11/2003 | Wilcox et al. | 375/150 |
| 6,963,599 B1 | * | 11/2005 | Dunn | 375/132 |
| 2002/0186754 A1 | * | 12/2002 | Kawai | 375/147 |

FOREIGN PATENT DOCUMENTS

| | | |
|---|---|---|
| JP | 06-204932 | 7/1994 |
| JP | 09-018446 | 1/1997 |

\* cited by examiner

*Primary Examiner*—Khanh C Tran
(74) *Attorney, Agent, or Firm*—Studebaker & Brackett PC; Donald R. Studebaker

(57) ABSTRACT

A synchronous follow-up circuit carries out correlation operation with a spread code on a receive signal, generated from a received signal in a symbol timing generator, by three symbol correlators, one for shifting the phase forward with respect to a symbol timing signal, another for synchronizing with the same and remaining one for shifting the same backward. Correlation power operators calculate respective correlation powers, and a correlation power comparator compares them with each other. The symbol timing generator adjusts the receive signal in phase on the basis of the comparison result. On the basis of the result of determining the correlation power in a correlation power decision circuit, the correlation powers are nullified, thereby preventing out-of-synchronization otherwise caused by a received signal including noise.

66 Claims, 7 Drawing Sheets

CIRCUIT FOR FOLLOWING UP SYNCHRONIZATION OF A SPREAD-CODED SIGNAL BY POWER COMPARISON AND PHASE ADJUSTMENT

BACKGROUND OF THE INVENTION

1. Field of the Invention

The present invention relates to a synchronous follow-up circuit for following up the synchronization of a received signal in a receiver or the like for receiving a signal spread with a spread code to acquire the synchronization of the received signal.

2. Description of the Background Art

Conventionally, some of the receivers or the like for receiving a signal spread with a spread code are adapted to roughly acquire the synchronization of the received signal through its synchronization acquisition circuit, and follow up the synchronization of the received signal through its synchronous follow-up circuit.

For example, a symbol synchronous circuit disclosed in Japanese patent laid-open publication No. 204932/1994 (patent document 1) generates a timing pulse in a symbol timing generator, shifts the phase of the timing pulse to generate a plurality of timing signals, compares those timing signals with a converting point pulse train, and selects an optimal timing signal to thereby accomplish the following-up of the synchronization.

Further, another type of synchronous follow-up circuit is disclosed in Japanese patent laid-open publication No. 18446/1997 (patent document 2). That synchronous follow-up circuit is adapted to receive by a symbol correlator signals having the respective phases thereof ordinary, advanced resultant from a multiplication with an Early PN (Pseudo Noise) code and retarded resultant from a multiplication with a Late PN code to obtain correlation values, and to compare on the basis of their mean value the difference or gradient with a threshold value to determine the synchronization, retardation and advance of the phase to follow up the synchronization.

In a symbol synchronous circuit disclosed in the above patent document 1, when instantaneous noise is included in a received signal, it also effects on a symbol correlation power so that an erroneous symbol phase is detected to cause out-of-synchronization. Particularly, in the case of complementary code keying (CCK) modulation where a spread code is extracted from a received signal to despread, when a spread code is erroneously extracted, despreading (symbol correlation) is performed based on that incorrect spread code, which leads to detection of an incorrect symbol phase, which in turn causes out-of-synchronization.

Further, in a synchronous follow-up circuit disclosed in above patent document 2, in order to avoid the out-of-synchronization caused by noise, there is introduced averaging of power values, while in such a case the speed following up the synchronization lowers due to operation for averaging, which may cause delay in detection timing.

SUMMARY OF THE INVENTION

It is an object of the present invention to provide a synchronous follow-up circuit for avoiding erroneous detection of a symbol phase and heightening the speed of following up synchronization.

In accordance with the invention, a synchronous follow-up circuit comprises a symbol timing generator responsive to an input received signal for generating an adjusted receive signal having a phase adjusted and a symbol timing signal, a symbol correlator for operating correlation of the adjusted receive signal to generate a correlation value, and a correlation power operator for carrying out power operation of the correlation value to generate a power value, the symbol correlator shifting the phase of the adjusted receive signal to resultantly operate correlation between a synchronous receive signal synchronizing in phase with the phase of the symbol timing and receive signals having the respective phases earlier and later than the phase of the synchronous receive signal at a timing corresponding to the symbol timing signal to generate a plurality of correlation values corresponding to the phases, the correlation power operator generating a plurality of power values respectively corresponding to the plurality of correlation values. The synchronous follow-up circuit further comprises a correlation power comparator for comparing the plurality of power values with each other to generate a comparison result indicating a phase adjustment of the adjusted receive signal, and a correlation power decision circuit for comparing a synchronous power value based on the synchronous receive signal with a predetermined threshold value and carries out determination to generate the decision result. The comparison result in the correlation power comparator is nullified on a basis of the decision result. The symbol timing generator adjusts the phase of the adjusted receive signal on a basis of the comparison result.

In accordance with a synchronous follow-up circuit of the present invention, in a circuit for operating correlation and power for a receive signal and receive signals associated with phases earlier and later than that of the synchronous receive signal to thereby determine the phase direction to be adjusted, when the correlation power after the operation of power is compared with the predetermined threshold value to be lower than the threshold value, it is determined that noise is included in the received signals, and the correlation power at this instance is nullified to thereby avoid out-of-synchronization otherwise caused by an incorrect symbol phase without delaying the timing of symbol detection.

Further, in the synchronous follow-up circuit in accordance with the invention, when a phase shift is detected by a phase shift detector on the basis of the power comparison result, a phase shift signal is outputted to an adder for a predetermined period of time to nullify the correlation power at this instance, thereby making it possible to prevent the phase from being excessively adjusted. In this context, the predetermined period of time may be set to a period from the time when a phase shift is detected to the time when correlation is operated for a phase-adjusted receive signal symbol by symbol.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
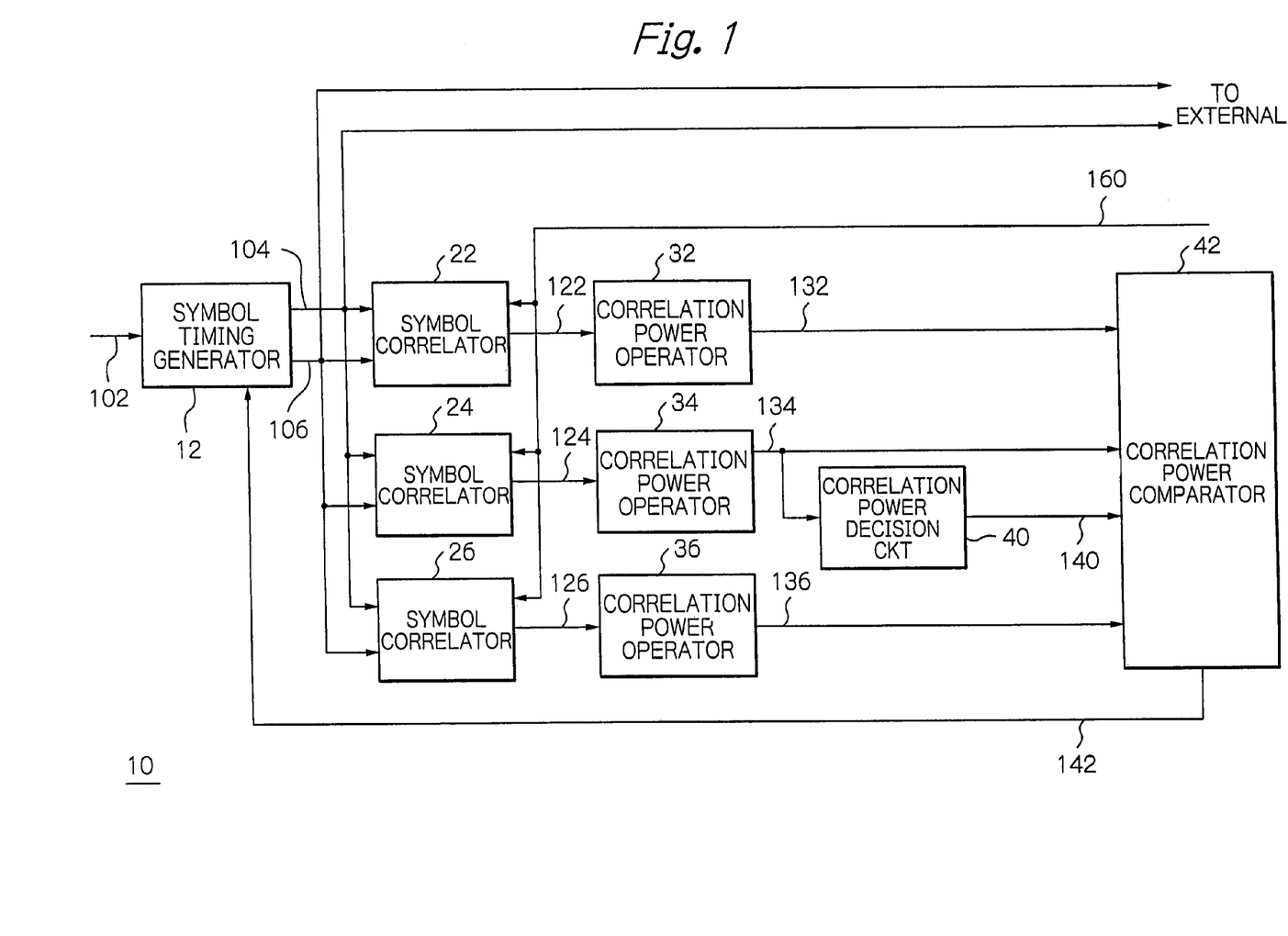
FIG. 1 is a schematic block diagram showing a preferred embodiment of a synchronous follow-up circuit in accordance with the present invention.

In the following, embodiments of the synchronous follow-up circuit will be described in detail in accordance with the present invention. For instance, the synchronous follow-up circuit 10 in accordance with the present invention, as shown in FIG. 1, is adapted to process a receive signal 102 in a symbol timing generator 12 to output a receive signal 104 and a symbol timing signal 106, to operate correlation on the signals 102, 104 and 106 with a spread code 160 in a symbol correlator 22 for shifting a phase forward, a symbol correlator 24 for synchronizing with the symbol timing signal 106 and a symbol correlator 26 for shifting a phase backward to then obtain symbol correlation values 122, 124 and 126, respectively, to calculate correlation powers 132, 134 and 136 on the basis of the correlation values in correlation power operators 32, 34 and 36, respectively, and to compare those correlation powers in a correlation power comparator 42 on the basis of the result of decision of a correlation power 134 in a correlation power decision circuit 40 to thereby produce a comparison result signal 142 to output the latter to the symbol timing generator 12. In this embodiment, one symbol is constituted of all the samples included in one period of the receive signal 102. In addition, parts or elements not directly related to understanding the present invention will be omitted from the drawings to avoid redundant description.

In the embodiment, the symbol timing generator 12, on one hand, adjusts the phase of the receive signal 102 inputted on the basis of the comparison result signal 142 from the power comparator 42, and then generates the receive signal 104 to output it to the symbol correlators 22, 24 and 26. The timing generator 12, on the other hands, obtains correlation of the receive signal 102 symbol by symbol to generate the symbol timing signal 106 to output it to the symbol correlators 22, 24 and 26. After the symbol synchronization has been established through the generation of the symbol timing signal 106, the symbol timing signal 106 is outputted for raising a timing pulse according to the symbol period. In the description hereinafter, respective signals will be specified with reference numerals of connections on which they appear.

The symbol timing generator 12 advances and retards the phase of the receive signal 102 in response to the comparison result signal 142 to then generate the receive signal 104. The timing generator 12 may therefore be adapted to temporarily store a predetermined number of samples of the received signals 102, and to delay the received signals 104 by the timing corresponding to the predetermined number of samples. For example, when one symbol of the receive signal 102 has been temporarily stored, the advance or retardation of the receive signal 104 can be adjusted within the period of the symbol.

In the symbol timing generator 12, the operation of symbol correlation for generating the symbol timing signal 106 may be autocorrelation operation of the receive signal 102, by which, for example, the symbol timing signal 106 is generated to establish synchronization with respect to one symbol of the receive signal 102. Also, in the embodiment, the symbol timing generator 12 carries out operation of an in-phase component (I) and a quadrature component (Q) on the receive signal 102 to then output the receive signal 104 containing the in-phase and quadrature components.

Here, the autocorrelation in this embodiment, where the receive signal 102 is a(j), is carried out to obtain p1 (k), a symbol timing signal 106, with an autocorrelation function of:

$$p_1(k) = \frac{1}{n}\sum_{j=0}^{n-1} a(j+k) * a(j), \qquad (1)$$

where, n represents the number of pieces of received data in a single symbol and k represents time. Further, the receive signal 102 in the embodiment is, for example, a complex number and the autocorrelation result is a complex number as well.

The symbol timing generator 12 may be adapted to output the receive signal 104 and the symbol timing signal 106 to, for example, a despread subsection, not shown, and then to a demodulator subsection of a radio modulating scheme for use in a receiver to which the instant circuit is applicable. As a radio modulating scheme for such a demodulator subsection, various schemes may be applicable, depending on a system to implement, such as BPSK (Binary Phase Shift Keying), DBPSK (Differential Binary Phase Shift Keying), QPSK (Quaternary Phase Shift Keying) or QAM (Quadrature Amplitude Modulation).

The symbol correlators 22, 24 and 26 operate correlation symbol by symbol between the receive signal 104 from the symbol timing generating circuit 12 and the spread code 160 from a demodulator subsection, not shown. The correlators define a timing to start the correlation operation and the like in response to the symbol timing signal 106 from the symbol timing generator 12. Also, the symbol correlators 22, 24 and 26 output symbol correlation values 122, 124 and 126 that are the result from the correlation operation to the correlation power operators 32, 34 and 36, respectively.

Particularly in this embodiment, the symbol correlators 22, 24 and 26 operate symbol correlation in a unit of symbol in every predetermined cycle, for example, in accordance with the timing of the symbol timing signal 106. Here, the symbol correlators 22, 24 and 26 operate correlation between the spread code 160 and the data which have the phase thereof shifted from that of the receive signal 104. The symbol correlator 22 operates data having the phase thereof advanced to be earlier than the timing of the symbol timing signal 106, the symbol correlator 24 operates data having the phase thereof synchronized with the timing of the symbol timing signal 106, and the symbol correlator 26 operates data having the phase thereof retarded to be later than the timing of the symbol timing signal 106.

In the embodiment, the symbol correlators 22, 24 and 26 may be adapted to operation symbol correlation with cross-correlation operation, and use a BARKER code or the like as a spread code 160. In the embodiment, the spread code 160 may be inputted from a demodulator subsection of radio modulation mode, not shown. Also, in the embodiment, as the receive signal 104 contains an in-phase and a quadrature component, the symbol correlation values 122, 124 and 126 are outputted also with an in-phase and a quadrature component included therein, respectively.

Now, the cross-correlation operation in the embodiment, where the spread code 160 is b(j) and the receive signal 104 is c(j), calculates a symbol correlation value p2 (k) by a cross-correlation function of:

$$p_2(k) = \frac{1}{n} \sum_{j=0}^{n-1} b(j+k) * c(j), \quad (2)$$

where, n represents the number of pieces of data in a single symbol and k represents time. When strong noise is momentarily included in the receive signal 102, the result from the operation by means of the above-indicated function is a value smaller than that in the case having no noise included. Further, the receive signal 104 in the embodiment is, for example, a complex number, and thus the cross-correlation result is a complex number as well. The correlation power resultant from the cross-correlation is of the largest value when the receive signal 104 is synchronized with the symbol timing signal, and may be representative of the magnitude of the correlation result, which is a complex number.

The correlation power operators 32, 34 and 36 operate the power of the expression, $I^2+Q^2$, for the in-phase component (I) and the quadrature component (Q) of correlation operation values 122, 124 and 126, and resultantly output the correlation powers 132, 134 and 136, respectively.

The correlation power decision circuit 40 receives a correlation power 134 that is the results from the symbol correlation operation and power operation for the data of the synchronization established between the timing of the symbol timing signal 106 and the phase thereof, and compares it with a predetermined threshold value to then output the resultant decision result signal 140. For instance, the correlation power decision circuit 40 may be adapted to output the result signal 140 made to be in its active state, when the correlation power 134 is lower than the predetermined threshold value, and otherwise in its passive state.

In the correlation power decision circuit 40 in the embodiment, when, for example, strong noise is instantaneously included in a received signal, the correlation power 134 to be inputted takes its small value, and thus, it is determined that the correlation power 134 does not reach the predetermined threshold value, whereby the decision result signal 140 can be made active.

The correlation power comparator 42 receives the correlation powers 132, 134 and 136 from the correlation power operators 32, 34 and 36, respectively, to compare their powers with each other to then output the resultant comparison result signal 142. With the instant embodiment, it compares the correlation powers 132, 134 and 136 associated with three different phases with each other to determine a power value having its value largest to output the comparison result signal 142 corresponding to the phase of the received signal originating the largest value.

At this instance, the comparison result signal 142 may be adapted to output a value of +1 (positive one) when the maximum power is the correlation power 132 originating the phase advancing from the symbol timing, output a value of zero when it is the correlation power 134 originating the phase synchronized with the symbol timing, and output a value of −1 (negative one) when it is the correlation power 136 originating the phase retarded from the symbol timing. Further, the comparator 42 may be adapted for outputting the result signal 142 having a value of zero when it compares the correlation powers 132, 134 and 136 but fails to determine which is maximum.

In the embodiment, particularly, the correlation power comparator 42 has a function of nullifying the comparison result signal 142 in response to the decision result signal 140.

For example, the comparator 42 is provided with a selectable function of the power comparison in response to the decision result signal 140 so as to develop, in response to the decision result signal 140 indicating the interruption of the power comparison, the comparison result signal 142 nullified, i.e. having its value of null.

In the synchronous follow-up circuit 10 of the embodiment, the spread code 160 is inputted thereto from a demodulator subsection, not shown. If the spread code 160 has its value fixed and not varying, however, the circuit 10 may then be arranged in such a way that it holds the spread code 160 therein.

Figure 2:
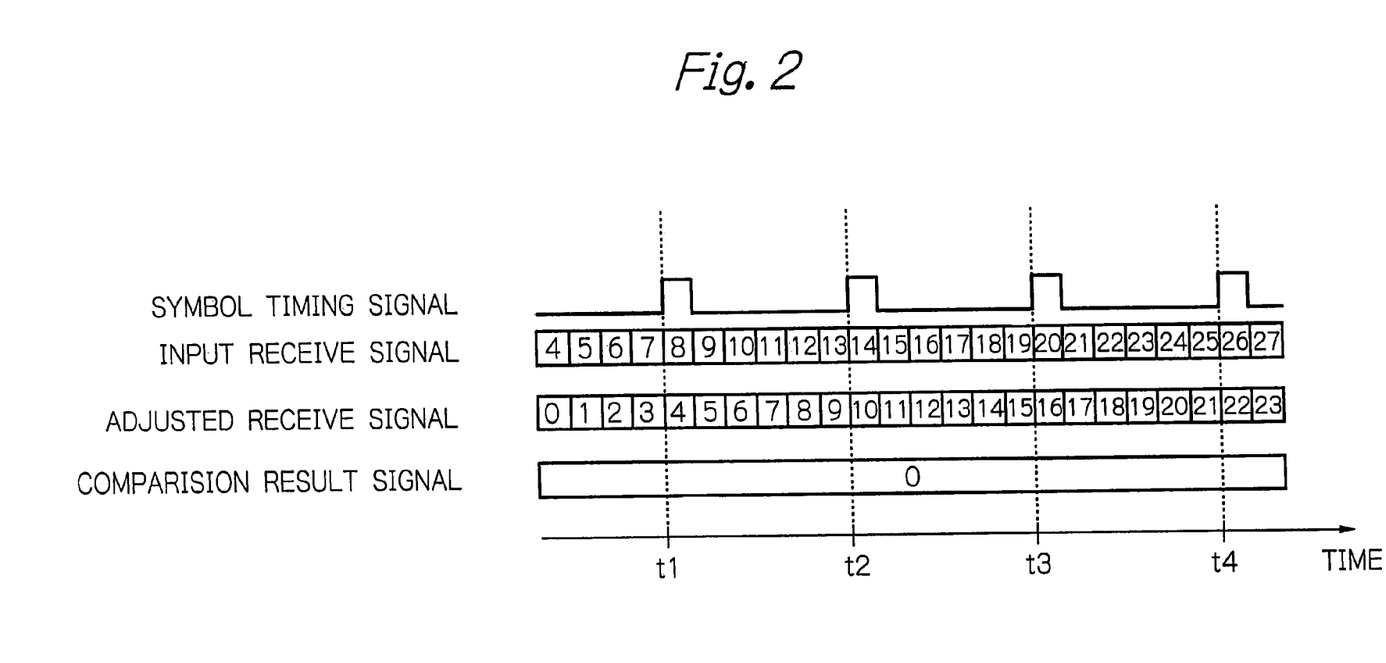
FIGS. 2, 3 and 4 are timing charts useful for understanding the operation of the synchronous follow-up circuit in the embodiment shown in FIG. 1.
Figure 3:
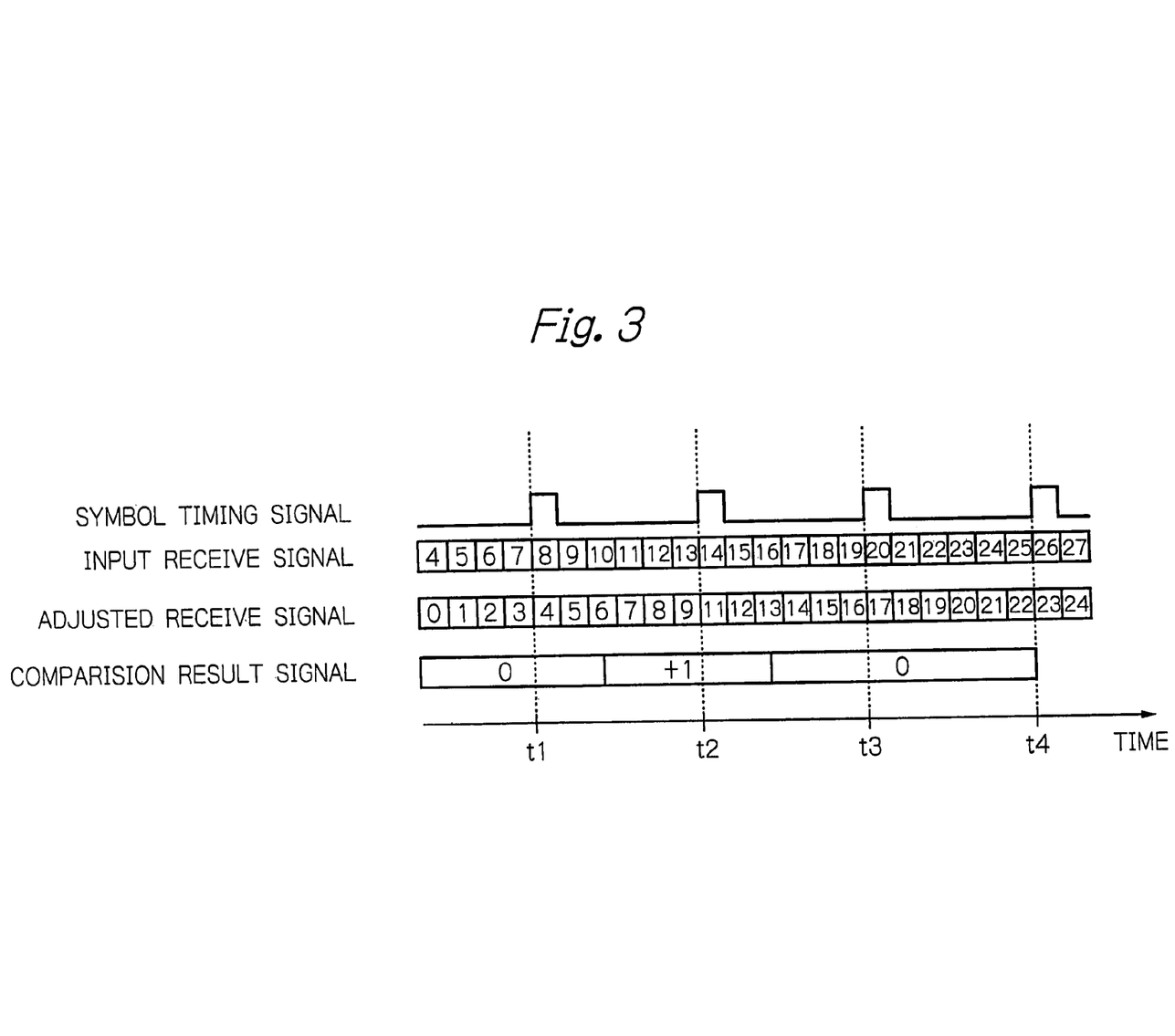
Figure 4:
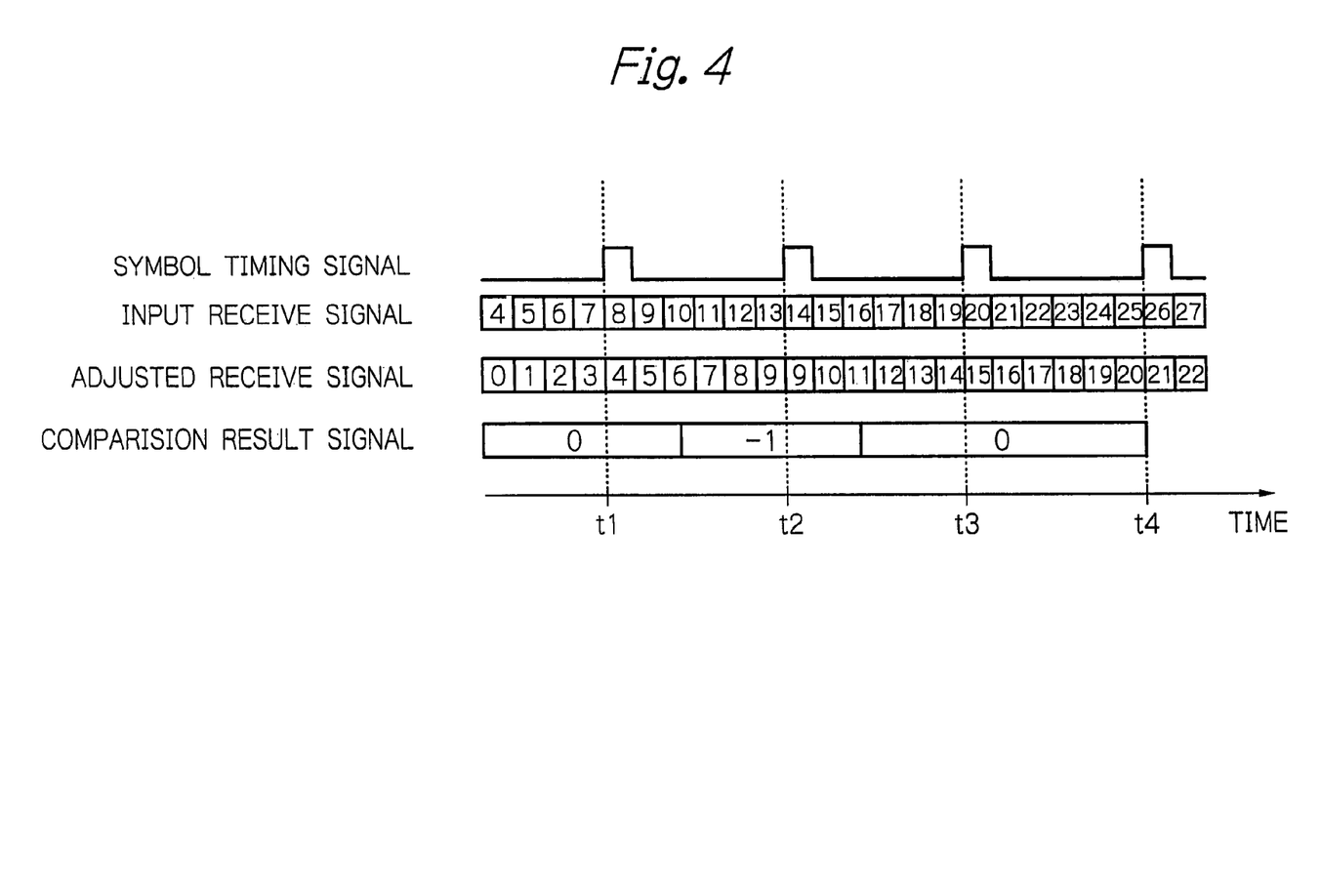

In the following, operation of the synchronous follow-up circuit 10 in the embodiment will be described with reference to timing charts of FIGS. 2, 3 and 4. In FIGS. 2, 3 and 4, the receive signals 102 and 104 are indicated as consecutive samples. Here, numerals indicated in the boxes of the samples are index Nos. representing the order of the sampled data and are shown as a matter of convenience in description of the operation.

In the synchronous follow-up circuit 10, a receive signal 102 is first received in a symbol timing generator 12. In the symbol timing generator 12, the received signals 102 are temporarily stored in turn. When a predetermined number of samples have been stored, the receive signal 104 representative of the samples is outputted. As shown in FIGS. 2, 3 and 4, the receive signal 104 is delayed being outputted due to its phase being shifted. For example, as shown in FIGS. 2, 3 and 4, during the period when the samples with index No. 0-3 thereof are inputted as the receive signal 102, no receive signal 104 is outputted. When the sample with its index No. 4 is inputted as the receive signal 102, then the sample with its index No. 0 is outputted as the receive signal 104.

Further, in the symbol timing generator 12 of the embodiment, the receive signal 102 is subjected to autocorrelation operation, so that a symbol timing signal 106 indicating a timing for a specific symbol is generated. For example, the symbol timing signal 106, as shown in FIG. 2, is a signal defining a periodic timing to form each symbol for six samples. When the receive signal 102 are inputted in the form of samples with index Nos. 8, 14, 20 and 26, i.e. at the time points t1, t2, t3 and t4, the timing pulses go positive.

In the symbol timing generator 12, the receive signal 104 is adjusted in phase on the basis of a comparison result signal 142 in timed with the positive-going edges of the symbol timing signal 106. For example, as shown in FIG. 2, when a value zero is inputted as the comparison result signal 142, the receive signal 104 is outputted with its phase unadjusted.

On the other hand, as shown in FIG. 3, in the symbol timing generator 12, when the comparison result signal 142 shows +1 (positive one) at the time t2 at which the timing pulse of the symbol timing signal 106 goes positive, the receive signal 104 is advanced in phase to cause the immediately preceding sample to be outputted. In the embodiment, at the time t2, a sample with index No. 10 would essentially have been outputted as the receive signal 104, whereas the immediately preceding sample, i.e. a sample with index No. 11, is outputted.

Further, as shown in FIG. 4, in the symbol timing generator 12, when the comparison result signal 142 is −1 (negative one) at the time point t2 at which the timing pulse of the symbol timing signal 106 goes negative, the receive signal 104 is retarded to cause the immediately following sample is outputted. In the embodiment, at the time t2, a sample with index No. 10 would essentially have been outputted, whereas the immediately following sample, i.e. a sample with index No. 9, is outputted.

Subsequently, the receive signal 104 and the symbol timing signal 106 are inputted in the symbol correlators 22, 24 and 26, where the receive signal 104 is operated symbol by symbol for correlation at a timing at which the timing pulse of the symbol timing signal 106 goes positive. The operation of correlation may be the operation of cross-correlation between one symbol of the receive signal 104 and the spread code 160.

Here, the symbol correlators 22, 24 and 26 are responsive in timing to the timing signal 106 to operate for correlation on a symbol formed based on the receive signal 104. Specifically, the symbol correlator 22 operates for correlation on a symbol formed with its phase advanced by one sample period from that timing, the symbol correlator 24 on a symbol formed with its phase synchronized with that timing, and the symbol correlator 26 on a symbol formed with its phase delayed by one sample period from that timing.

In the symbol correlator 22, symbols are constituted of the data earlier by one sample period than the timing of the symbol timing signal 106. For example, in which the first symbol is constituted of samples indicated with index Nos. 3, 4, 5, 6, 7 and 8, the second symbol is of samples indicated with index Nos. 9, 10, 11, 12, 13 and 14, and the third symbol is of samples indicated with index Nos. 15, 16, 17, 18, 19 and 20.

Correspondingly, in the symbol correlator 24, symbols are constituted of the data having the phase synchronized with the timing of the symbol timing signal 106. Fro example, the first symbol is constituted of samples indicated with index Nos. 4, 5, 6, 7, 8 and 9, the second symbol is of samples indicated with index Nos. 10, 11, 12, 13, 14 and 15, and the third symbol is of samples indicated with index Nos. 16, 17, 18, 19, 20 and 21.

Also, in the symbol correlator 26, symbols are constituted of the data later by one sample period than the timing of the symbol timing signal 106. For example, the first symbol is constituted of samples indicated with index Nos. 5, 6, 7, 8, 9 and 10, the second symbol is of samples indicated with index Nos. 11, 12, 13, 14, 15 and 16, and the third symbol is of samples indicated with index Nos. 17, 18, 19, 20, 21 and 22.

Further, the spread code 160 is constituted of the pieces of data the same in number as the samples of a symbol to be operated for correlation. With the embodiment in which operation takes place for correlation with a symbol having six samples, the spread code 160 may be constituted of six pieces of data.

In the embodiment, for instance, when the spread code 160 is data, a1, a2, a3, a4, a5 and a6, the symbol correlator 22 executes operation of correlation between the first symbol with sample Nos. 3, 4, 5, 6, 7 and 8 and data, a1, a2, a3, a4, a5 and a6, between the second symbol with sample Nos. 9, 10, 11, 12, 13 and 14 and data, a1, a2, a3, a4, a5 and a6, and between the third symbol with sample Nos. 15, 16, 17, 18, 19 and 20 and data, a1, a2, a3, a4, a5 and a6. In the same way, the symbol correlator 24 executes operation of correlation between the first symbol with sample Nos. 4, 5, 6, 7, 8 and 9 and data, a1, a2, a3, a4, a5 and a6, between the second symbol with sample Nos. 10, 11, 12, 13, 14 and 15 and data, a1, a2, a3, a4, a5 and a6, and between the third symbol with sample Nos. 16, 17, 18, 19, 20 and 21 and data, a1, a2, a3, a4, a5 and a6. Further, the symbol correlator 26 executes operation of correlation between the first symbol with sample Nos. 5, 6, 7, 8, 9 and 10 and data, a1, a2, a3, a4, a5 and a6, between the second symbol with sample Nos. 11, 12, 13, 14, 15 and 16 and data, a1, a2, a3, a4, a5 and a6, and between the third symbol with sample Nos. 17, 18, 19, 20, 21 and 22 and data, a1, a2, a3, a4, a5 and a6.

Now, the receive signal 104 and the symbol timing signal 106 outputted from the symbol timing generator 12 are inputted to, for example, a despread subsection, not shown, and then forwarded to a demodulator subsection complying with the radio modulation scheme employed in the synchronous follow-up circuit 10.

For instance, when the spread code 160 is of $\{1, -1, 1, -1, -1, 1\}$, and a transmit signal is to be transmitted to the synchronous follow-up circuit 10 including the symbol correlators 22, 24 and 26 with the symbol phase thereof being $\{I=1, Q=0\}$, the transmit signal is spread so that the I axis component of the transmit signal is indicated with $\{I^*1, I^*(-1), I^*1, I^*(-1), I^*(-1), I+1\}=\{1, -1, 1, -1, -1, 1\}$ and the Q axis component with $\{Q^*1, Q^*(-1), Q^*1, Q^*(-1), Q^*(-1), Q^*1\}=\{0, 0, 0, 0, 0, 0\}$.

When the transmit signal is received by the circuit 10 of the embodiment, it is despread by a despreading subsection through the procedure similar to spreading. Here, when the I axis component of a spread code is indicated with data, a1, a2, a3, a4, a5 and a6, and the Q axis component thereof is indicated with data, b1, b2, b3, b4, b5 and b6, the I axis component of the received signal is $\{1, -1, 1, -1, -1, 1\}$ and the Q axis component $\{0, 0, 0, 0, 0, 0\}$. The symbol phase resultant from the despreading will be that the I axis component is indicated with $\{1^*a1+(-1)^*a2+1^*a3+(-1)^*a4 +(-1)^*a5+1^*a6\}/6=\{1\}$ and the Q axis component with $\{0^*b1+ 0^*b2 +0^*b3+0^*b4+0^*b5+0^*b6\}/6=\{0\}$.

In WLAN (Wireless Local Area Network) or the like, in addition to a spread code whose Q axis component is all consisted of zeros, such as BPSK (Binary Phase Shifting Keying), a spread code may be exploited which has its Q axis component having its value not limited to zero, such as QPSK (Quadrature Phase Shift Keying). The illustrative embodiment uses, however, the BPSK spread code, having its Q axis component all consisted of zeros, so that the spread code is indicated with $\{1, -1, 1, -1, -1, 1\}$.

Further, the symbol correlation values 122, 124 and 126 resulting from the operation in the symbol correlators 22, 24 and 26 are inputted to the correlation power operators 32, 34 and 36, respectively, where the in-phase component I and quadrature component Q thereof are operated by the expression, $I^2+Q^2$, and the resultant correlation powers 132, 134 and 136 are outputted to the correlation power comparator 42.

On the other hand, the correlation power 134 from the correlation power operator 34 is inputted to the correlation power decision circuit 40, where it is compared with a predetermined threshold value, and the resultant decision result signal 140 is outputted to the correlation power comparator 42. The correlation power decision circuit 40 of the embodiment outputs, for example, when noise is momentarily included in the received signal to cause the correlation power 134 to be lower than the predetermined threshold value, a result signal 140 in its active state, whereas, when no noise is included in the received signal to cause the correlation power 134 to be higher than the predetermined threshold value, the result signal 140 in its passive state.

In the correlation power comparator 42, the correlation powers 132, 134 and 136 are compared with each other, out of which a signal having the largest power value is determined in the embodiment. When the decision result signal 140 is in its active state, i.e. when noise is included in the received signal, the power comparison is suspended. By contrast, only when the signal 140 is in its passive state, i.e. when no noise exists in the received signal, then the power comparison is conducted. The comparison result signal 142 will be generated representative of the result from the power comparison.

The correlation power comparator 42 may be adapted to output, for instance, when the decision result signal 140 is in its passive state, the comparison result signal 142 having its value being +1 when the correlation power value 132 corresponding to the advanced phase is largest, and, when the correlation power value 136 corresponding to the delayed phase is largest, the comparison result signal 142 having its value being −1, otherwise the comparison result signal 142 having its value being zero being outputted. For example, when the decision result signal 140 is in its active state and the power comparison is suspended, the comparison result signal 142 having a value of zero may be outputted.

In the embodiment, the comparison result signal 142 is outputted in that way from the correlation power comparator 42 to the symbol timing generator 12, and the processing described in paragraphs [0032] through [0049] will be repeated.

Figure 5:
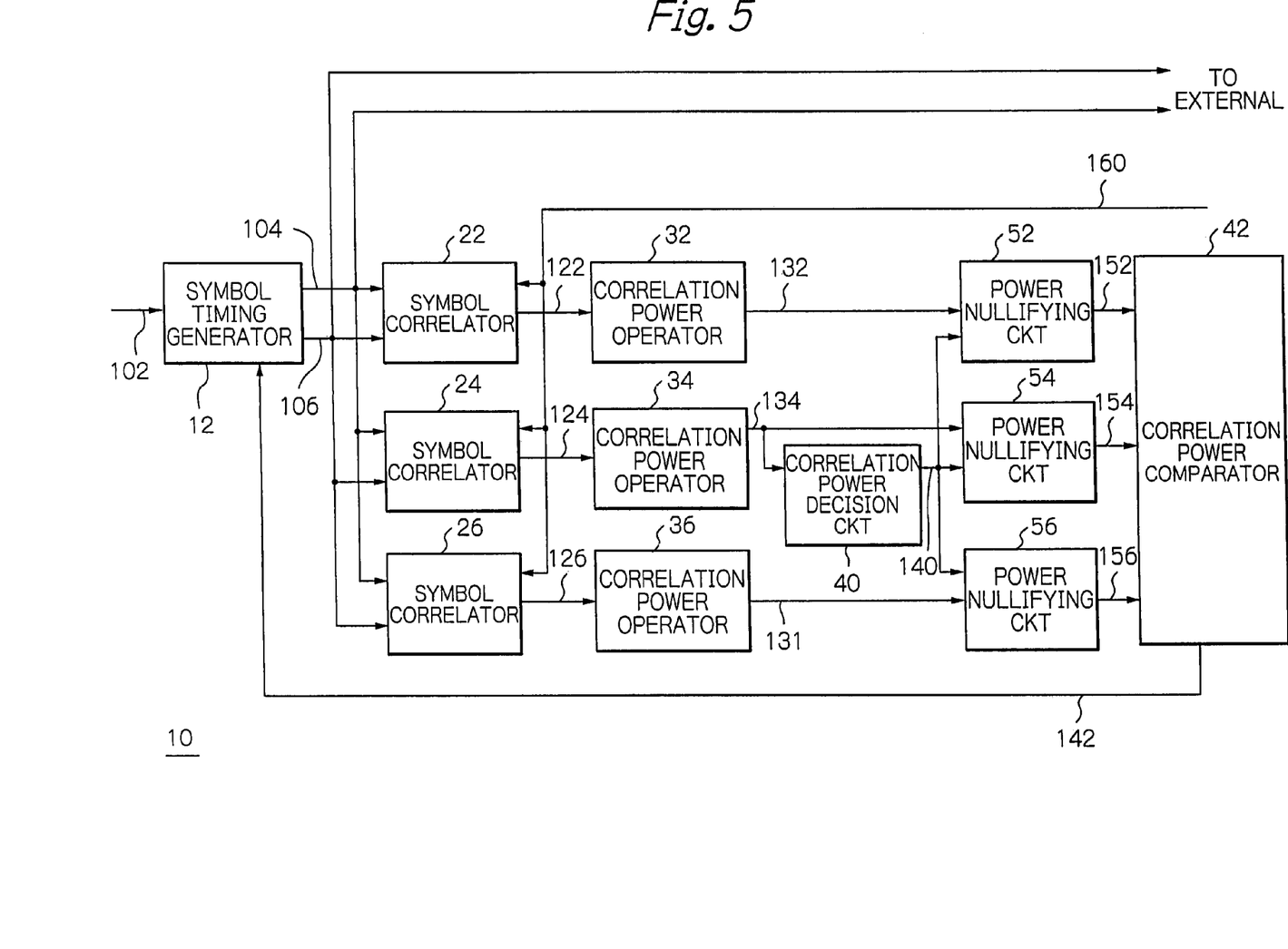
FIG. 5 is a schematic block diagram showing an alternative embodiment of the synchronous follow-up circuit in accordance with the present invention.

With an alternative embodiment, as shown in FIG. 5, the synchronous follow-up circuit 10 includes correlation power nullifying circuits 52, 54 and 56 to nullify the correlation powers 132, 134 and 136 on the basis of the decision result signal 140.

The correlation power nullifying circuits 52, 54 and 56 receive the correlation powers 132, 134 and 136 from the correlation power operators 32, 34 and 36, respectively. The nullifying circuits 52, 54 and 56 are adapted to provide the correlation power comparator 42 with, for example, when the decision result signal 140 is not in its active state, the power values 152, 154 and 156, representative of the correlation powers 132, 134 and 136, respectively, whereas, when the decision result signal 140 is in its active state, values of zero on the power value outputs 152, 154 and 156, respectively, as the nullified power values.

In this embodiment, the correlation power nullifying circuits 52, 54 and 56 execute the processing in response to the decision result signal 140. The power comparison may therefore be made in the correlation power comparator 42 without switching in response to the decision result signal 140, and the result signal 140 is not necessarily inputted thereto.

In the alternative embodiment, when noise is included in a received signal to cause the correlation power 134 having a smaller value to be inputted to the correlation power decision circuit 40, the correlation power value 134 is not determined as exceeding the predetermined threshold value to output the decision result signal 140 which is in its active state to the correlation power nullifying circuits 52, 54 and 56. Then, in the correlation power nullifying circuits 52, 54 and 56, the correlation power is nullified so that the power values 152, 154 and 156 each having a value of zero are delivered to the correlation power comparator 42. The correlation power comparator 42 receives the correlation power thus nullified to fail to detect the largest power value to output the comparison result signal 142 having, for example, a value of zero. Accordingly, phase shifting does not take place for the receive signal 102 in the symbol timing generator 42.

By contrast, when noise is not included in a received signal, the correlation power 134 higher than the predetermined threshold value is inputted to the correlation power decision circuit 40, and the decision result signal 140 in its passive state is outputted to the correlation power nullifying circuits 52, 54 and 56. Then, the correlation power nullifying circuits 52, 54 and 56 do not nullify the correlation powers 132, 134 and 136 to output the power values 152, 154 and 156, respectively, to the correlation power comparator 42. The correlation power comparator 42 outputs the comparison result signal 142 on the basis of the comparison result of the power values.

Figure 6:
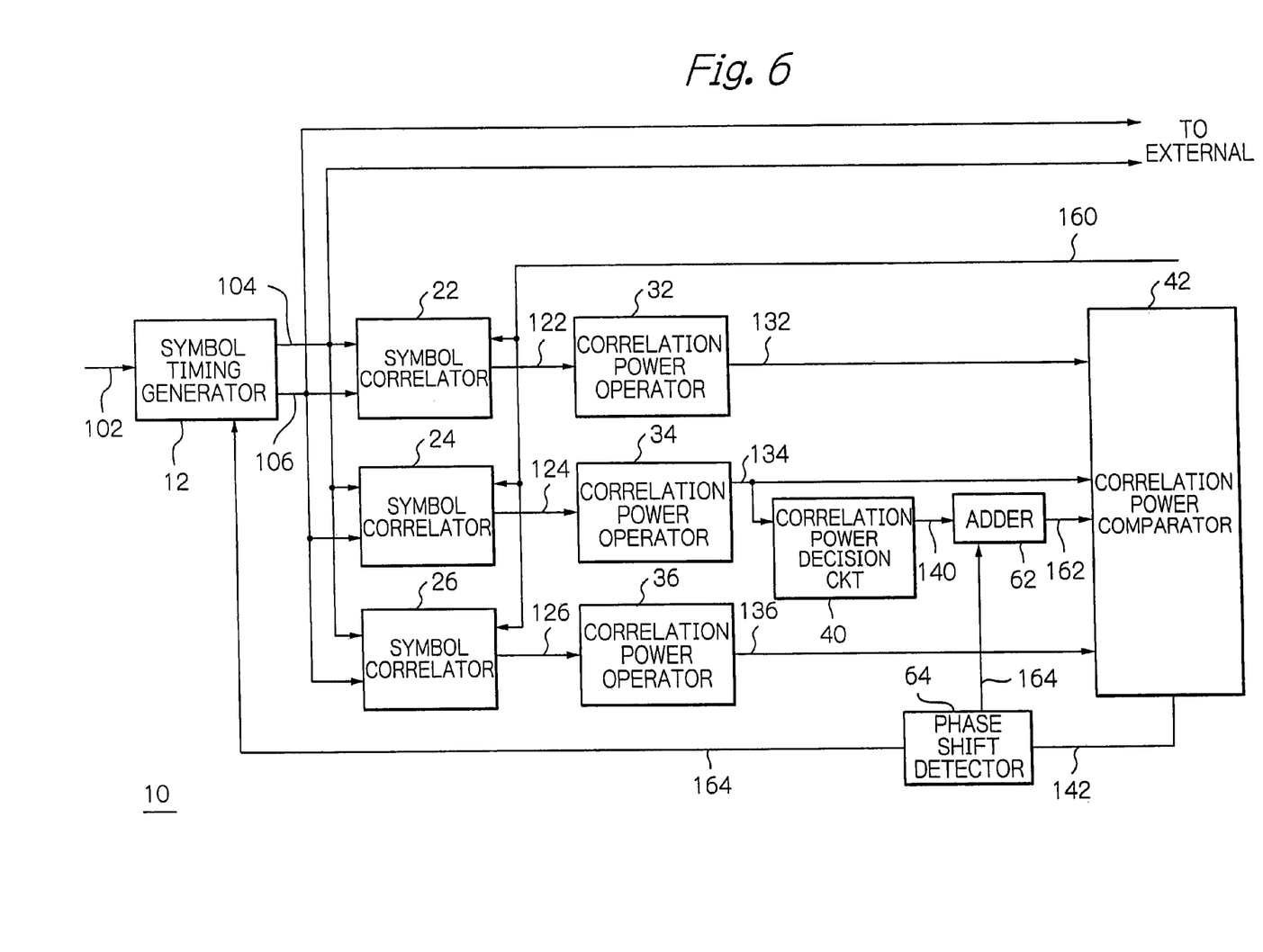
FIG. 6 is a block diagram showing another alternative embodiment of the synchronous follow-up circuit in accordance with the present invention.

Also, referring to another alternative embodiment, the synchronous follow-up circuit 10, as shown in FIG. 6, includes an adder 62, which is adapted to provide the correlation power comparator 42 with a nullification signal 162 representative of a logical sum of the decision result signal 140 and a phase shift detection signal 164. The phase shift detection signal 164 is outputted from the phase shift detector 64 for detecting a phase shift in response to the comparison result signal 142.

The phase shift detector 64 is adapted to detect a value of +1 or −1 in the comparison result signal 142, i.e. a phase shift, to output the phase shift detection signal 164 having a value of 1 for a predetermined period. The predetermined period may be set to be longer than the length of the processing time in the symbol correlator and the correlation power operator. For example, it may be set substantially equal to a period of time from the symbol correlation of a received signal being adjusted to the correlation power being processed.

In a modification to the alternative embodiment, when the phase shift detector 64 detects a phase shift, it outputs the phase shift detection signal 164 to the adder 62 for the predetermined period. Accordingly, the power comparison in the correlation power comparator 42 can be nullified regardless of the decision result signal 140.

The phase shift detection signal 164 may be directly connected to the correlation power decision circuit 40 or the correlation power comparator 42 so as to suspend the power comparison in the correlation power comparator 42 for a predetermined length of time.

With a further modification to the embodiment, the synchronous follow-up circuit 10 shown in FIG. 6 may be arranged to include the correlation power value nullifying circuits 52, 54 and 56 shown in FIG. 5.

Figure 7:
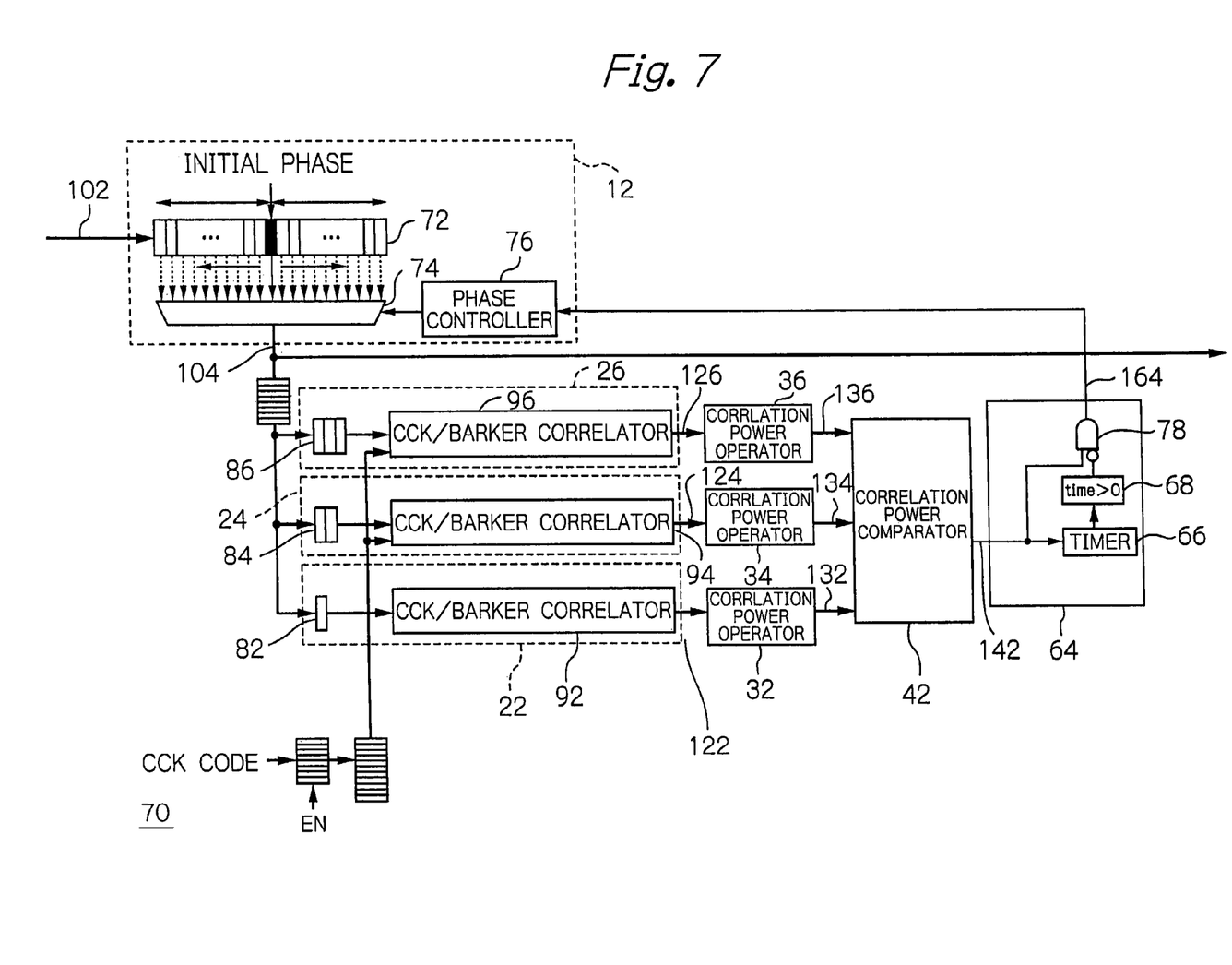
FIG. 7 is a schematic block diagram showing an example of a circuit to which the synchronous follow-up circuit shown in FIG. 6 is applied.

The synchronous follow-up circuit 10 in accordance with the present invention can also be applicable to an exemplified application shown as a synchronous follow-up circuit 70 in FIG. 7. The synchronous follow-up circuit 70 comprises a symbol timing generator 12, which is configured to include flip-flops 72, a selector 74 and a phase controller 76, which are interconnected as illustrated. In the timing generator 12, input data 102 containing the I and Q components are inputted to the flip-flops 72, and then the selector 74 outputs selected input data 104 under the control of the phase controller 76. The flip-flops 72 may be adapted, for example, to hold nine chips of data before and after the initial phase. Further, the phase controller 76 may be a circuit for controlling selection in the selector 74 in response to a phase adjustment signal 164 from the phase shift detector 64. In this way, the symbol timing generator 12 in the application adjusts the phase of the input data 102 in response to the phase adjustment signal 164 to then output the input data 104.

Further, in the synchronous follow-up circuit 70, symbol correlators 22, 24 and 26 are configured to include phase adjustors 82, 84 and 86 and CCK/BARKER correlators 92, 94 and 96, respectively, and to receive the input data 104 to adjust the phase of the data in the respective phase adjusters and operate correlation on the data in the respective correlators.

Now, the phase adjustor 82 outputs the input data 104 having the phase advanced by one sample period. The phase adjustor 84 outputs the input data 104 without shifting the phase thereof. The phase adjustor 86 outputs the input data 104 having the phase delayed by one sample period. The phase adjustors 82, 84 and 86 may be constituted of flip-flops. Also, the CCK/BARKER correlators 92, 94 and 96 may be constituted of flip-flops, multipliers, adders and other circuit components.

In the synchronous follow-up circuit 70, the correlation power operators 32, 34 and 36 carry out power operation of the expression, $I^2+Q^2$, to then output the correlation powers 132, 134 and 136. The correlation power comparator 42 carries out comparison of the correlation powers 132, 134 and 136 with each other to then output the comparison result signal 142. The application shown in FIG. 7 may include the correlation power decision circuit 40 and the adder 62, although not specifically illustrated.

In the synchronous follow-up circuit 70 of this application, particularly the phase shift detector 64 comprises a timer 66 including a decrementing type of counter and a comparator 68 for carrying out zero detection in a count of the counter. The phase shift detector 64 receives the comparison result signal 142 to detect a phase shift.

Now, the timer 66 carries out detection of a phase offset or shift. The timer 66, when detected a phase offset, sets the timer 66 to its maximum value to decrement therefrom, and stops decrementing when the down-counting reaches zero.

The comparator 68 is a zero detecting circuit, which receives a count from the timer 66 to detect zero included therein. The comparator 68 outputs a binary one (high level) for a period of time from the timer 66 being set to its maximum value to the timer 66 decrementing to zero. Otherwise, the timer 66 outputs a binary zero (low level).

The comparator 68 has its output interconnected to a masking section 78, such as a logical OR gate, together with the comparison result signal 142. The output of the comparator 68 is masked by the logical OR operation and then outputted to the phase adjustment signal 164. Accordingly, the phasing does not take place for a period of time during which the timer 66 functions, i.e. for a period of time the timer 66 does not include zero on its count.

Further, the maximum value of the timer 66 may be set such as to count, for example, a period of time from a received signal being adjusted in phase to a symbol correlation power being a power value with its phase adjusted.

A symbol correlation power is usually an average of power values for a plurality of symbols. In that application stated above, therefore, when phase adjustment takes place on the basis of the result of comparison in magnitude between power values, a predetermined length of time is required until a correlation power is detected based on the result of the phase adjustment. Accordingly, even when the phase adjustment takes place before the predetermined length of time elapses, a further phase adjustment may possibly be taken place until a correlation power value is detected.

In the synchronous follow-up circuit 70, detection of a phase shift in the phase shift detector 64 is made for observing execution of phase adjustment. The system is so configured that after the phase has been adjusted, the phase is inhibited from being adjusted by the timer 66 for a period of time from the phase being adjusted to a symbol correlation power being detected. Thereby, excessive phase adjustment is prevented in the synchronous follow-up circuit 70.

The entire disclosure of Japanese patent application No. 2004-242442 filed on Aug. 23, 2004, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A synchronous follow-up circuit comprising:
a symbol timing generator responsive to an input received signal for generating an adjusted receive signal having a phase adjusted and a symbol timing signal;
a symbol correlator for operating correlation of the adjusted receive signal to generate a correlation value; and
a correlation power operator for carrying out power operation of the correlation value to generate a power value,
said symbol correlator shifting the phase of the adjusted receive signal to resultantly operate correlation between a synchronous adjusted receive signal synchronizing in phase with the phase of the symbol timing and adjusted receive signals having the respective phases earlier and later than the phase of the synchronous adjusted receive signal at a timing corresponding to the symbol timing signal to generate a plurality of correlation values corresponding to the phases, said correlation power operator generating a plurality of power values respectively corresponding to the plurality of correlation values,
said synchronous follow-up circuit further comprising: a correlation power comparator for comparing the plurality of power values with each other to generate a comparison result indicating a phase adjustment of the adjusted receive signal; and
a correlation power decision circuit for comparing a synchronous power value based on the synchronous adjusted receive signal with a predetermined threshold value and carries out determination to generate the decision result, the comparison result in said correlation power comparator being nullified on a basis of the decision result, said symbol timing generator adjusting the phase of the adjusted receive signal on a basis of the comparison result.

2. The synchronous follow-up circuit in accordance with claim 1, wherein said correlation power comparator suspends, when the decision result is that the synchronous power value is lower than a predetermined threshold value, the power comparison between the plurality of power values to generate the comparison result nullified, while otherwise comparing in power the power values to generate the power comparison result.

3. The synchronous follow-up circuit in accordance with claim 1, further comprising a correlation power nullifying circuit for outputting the plurality of power values nullified on the basis of the decision result, or outputting the plurality of power values as they are, said correlation power comparator comparing the power values outputted from said correlation power nullifying circuit to generate the comparison result.

4. The synchronous follow-up circuit in accordance with claim 3, wherein said correlation power nullifying circuit outputs, when the decision result is that the synchronous power value is lower than the predetermined threshold value, the plurality of power values, while otherwise outputting the plurality of power values as they are.

5. The synchronous follow-up circuit in accordance with claim 1, the correlation operation in said symbol correlator is cross-correlation operation by means of a spread code.

6. The synchronous follow-up circuit in accordance with claim 2, the correlation operation in said symbol correlator is cross-correlation operation by means of a spread code.

7. The synchronous follow-up circuit in accordance with claim 3, the correlation operation in said symbol correlator is cross-correlation operation by means of a spread code.

8. The synchronous follow-up circuit in accordance with claim 4, the correlation operation in said symbol correlator is cross-correlation operation by means of a spread code.

9. The synchronous follow-up circuit in accordance with claim 1, wherein the correlation operation in said symbol correlator operates an in-phase component I and a quadrature component Q of the correlation value by means of an expression, $I^2+Q^2$, to generate the power values.

10. The synchronous follow-up circuit in accordance with claim 2, wherein the correlation operation in said symbol correlator operates an in-phase component I and a quadrature component Q of the correlation value by means of an expression, $I^2+Q^2$, to generate the power values.

11. The synchronous follow-up circuit in accordance with claim 3, wherein the correlation operation in said symbol correlator operates an in-phase component I and a quadrature component Q of the correlation value by means of an expression, $I^2+Q^2$, to generate the power values.

12. The synchronous follow-up circuit in accordance with claim 4, wherein the correlation operation in said symbol correlator operates an in-phase component I and a quadrature component Q of the correlation value by means of an expression, $I^2+Q^2$, to generate the power values.

13. The synchronous follow-up circuit in accordance with claim 5, wherein the correlation operation in said symbol correlator operates an in-phase component I and a quadrature component Q of the correlation value by means of an expression, $I^2+Q^2$, to generate the power values.

14. The synchronous follow-up circuit in accordance with claim 1, wherein said symbol correlator comprises a first correlator for operating correlation for the synchronous adjusted receive signal to generate a first correlation value, a second correlator for operating correlation for an adjusted receive signal having the phase advanced by one sample period out of adjusted receive signals having phases earlier and later than that of the synchronous adjusted receive signal to generate a second correlation value, and a third correlator for operating correlation for an adjusted receive signal retarded by one sample period to generate a third correlation value, said correlation power operator comprising a first power operator for calculating a first power value from the first correlation value, a second power operator for calculating a second power value from the second correlation value, and a third power operator for calculating a third power value from the third correlation value, said correlation power decision circuit comparing the first power value as the synchronous power value with the predetermined threshold value to make a decision to generate the decision result.

15. The synchronous follow-up circuit in accordance with claim 2, wherein said symbol correlator comprises a first correlator for operating correlation for the synchronous adjusted receive signal to generate a first correlation value, a second correlator for operating correlation for an adjusted receive signal having the phase advanced by one sample period out of adjusted receive signals having phases earlier and later than that of the synchronous adjusted receive signal to generate a second correlation value, and a third correlator for operating correlation for an adjusted receive signal retarded by one sample period to generate a third correlation value, said correlation power operator comprising a first power operator for calculating a first power value from the first correlation value, a second power operator for calculating a second power value from the second correlation value, and a third power operator for calculating a third power value from the third correlation value, said correlation power decision circuit comparing the first power value as the synchronous power value with the predetermined threshold value to make a decision to generate the decision result.

16. The synchronous follow-up circuit in accordance with claim 3, wherein said symbol correlator comprises a first correlator for operating correlation for the synchronous adapted receive signal to generate a first correlation value, a second correlator for operating correlation for an adjusted receive signal having the phase advanced by one sample period out of adjusted receive signals having phases earlier and later than that of the synchronous adjusted receive signal to generate a second correlation value, and a third correlator for operating correlation for an adjusted receive signal retarded by one sample period to generate a third correlation value, said correlation power operator comprising a first power operator for calculating a first power value from the first correlation value, a second power operator for calculating a second power value from the second correlation value, and a third power operator for calculating a third power value from the third correlation value, said correlation power decision circuit comparing the first power value as the synchronous power value with the predetermined threshold value to make a decision to generate the decision result.

17. The synchronous follow-up circuit in accordance with claim 4, wherein said symbol correlator comprises a first correlator for operating correlation for the synchronous adjusted receive signal to generate a first correlation value, a second correlator for operating correlation for an adjusted receive signal having the phase advanced by one sample period out of adjusted receive signals having phases earlier and later than that of the synchronous adjusted receive signal to generate a second correlation value, and a third correlator for operating correlation for an adjusted receive signal retarded by one sample period to generate a third correlation value, said correlation power operator comprising a first power operator for calculating a first power value from the first correlation value, a second power operator for calculating a second power value from the second correlation value, and a third power operator for calculating a third power value from the third correlation value, said correlation power decision circuit comparing the first power value as the synchronous power value with the predetermined threshold value to make a decision to generate the decision result.

18. The synchronous follow-up circuit in accordance with claim 5, wherein said symbol correlator comprises a first correlator for operating correlation for the synchronous adjusted receive signal to generate a first correlation value, a second correlator for operating correlation for an adjusted receive signal having the phase advanced by one sample period out of adjusted receive signals having phases earlier and later than that of the synchronous adjusted receive signal to generate a second correlation value, and a third correlator for operating correlation for an adjusted receive signal retarded by one sample period to generate a third correlation value, said correlation power operator comprising a first power operator for calculating a first power value from the first correlation value, a second power operator for calculating a second power value from the second correlation value, and a third power operator for calculating a third power value from the third correlation value, said correlation power decision circuit comparing the first power value as the synchronous power value with the predetermined threshold value to make a decision to generate the decision result.

19. The synchronous follow-up circuit in accordance with claim 9, wherein said symbol correlator comprises a first correlator for operating correlation for the synchronous adjusted receive signal to generate a first correlation value, a second correlator for operating correlation for an adjusted receive signal having the phase advanced by one sample period out of adjusted receive signals having phases earlier and later than that of the synchronous adjusted receive signal to generate a second correlation value, and a third correlator for operating correlation for an adjusted receive signal retarded by one sample period to generate a third correlation value, said correlation power operator comprising a first power operator for calculating a first power value from the first correlation value, a second power operator for calculating a second power value from the second correlation value, and a third power operator for calculating a third power value from the third correlation value, said correlation power decision circuit comparing the first power value as the synchronous power value with the predetermined threshold value to make a decision to generate the decision result.

20. The synchronous follow-up circuit in accordance with claim 14, wherein said correlation power comparator compares the first power value, the second power value and the third power value with each other to generate, when the second power value is largest, the comparison result indicating a phase delay to the adjusted receive signal, and to generate, when the third power value is largest, the comparison result indicating a phase advance to the adjusted receive signal, while otherwise generating the comparison result not indicating the phase adjustment to the adjusted receive signal.

21. The synchronous follow-up circuit in accordance with claim 20, wherein, said correlation power comparator generates, when the second power value is largest, the comparison result having a value of −1, and, when the thirst power value is the largest, the comparison result having a value of +1, while otherwise generating the comparison result having a value of zero.

22. The synchronous follow-up circuit in accordance with claim 1, further comprising a phase shift detector for generating a phase shift detection signal on the basis of the comparison result, the phase shift detection signal causing the comparison result in said correlation power comparator to be nullified for a predetermined period of time.

23. The synchronous follow-up circuit in accordance with claim 2, further comprising a phase shift detector for generating a phase shift detection signal on the basis of the comparison result, the phase shift detection signal causing the comparison result in said correlation power comparator to be nullified for a predetermined period of time.

24. The synchronous follow-up circuit in accordance with claim 3, further comprising a phase shift detector for generating a phase shift detection signal on the basis of the comparison result, the phase shift detection signal causing the comparison result in said correlation power comparator to be nullified for a predetermined period of time.

25. The synchronous follow-up circuit in accordance with claim 4, further comprising a phase shift detector for generating a phase shift detection signal on the basis of the comparison result, the phase shift detection signal causing the comparison result in said correlation power comparator to be nullified for a predetermined period of time.

26. The synchronous follow-up circuit in accordance with claim 5, further comprising a phase shift detector for generating a phase shift detection signal on the basis of the comparison result, the phase shift detection signal causing the comparison result in said correlation power comparator to be nullified for a predetermined period of time.

27. The synchronous follow-up circuit in accordance with claim 9, further comprising a phase shift detector for generating a phase shift detection signal on the basis of the comparison result, the phase shift detection signal causing the comparison result in said correlation power comparator to be nullified for a predetermined period of time.

28. The synchronous follow-up circuit in accordance with claim 14, further comprising a phase shift detector for generating a phase shift detection signal on the basis of the comparison result, the phase shift detection signal causing the comparison result in said correlation power comparator to be nullified for a predetermined period of time.

29. The synchronous follow-up circuit in accordance with claim 20, further comprising a phase shift detector for generating a phase shift detection signal on the basis of the comparison result, the phase shift detection signal causing the comparison result in said correlation power comparator to be nullified for a predetermined period of time.

30. The synchronous follow-up circuit in accordance with claim 21, further comprising a phase shift detector for generating a phase shift detection signal on the basis of the comparison result, the phase shift detection signal causing the comparison result in said correlation power comparator to be nullified for a predetermined period of time.

31. The synchronous follow-up circuit in accordance with claim 22, wherein said phase shift detector generates, in response to detection that the phase adjustment in the comparison result indicates advance or delay, the phase shift detection signal nullifying the comparison result in said correlation power comparator for a predetermined period of time for the predetermined period of time.

32. The synchronous follow-up circuit in accordance with claim 31, further comprising an adder for operating a logical sum of the decision result and the phase shift detection signal, a result from the logical sum causing the comparison result in said correlation power comparator to be nullified for a predetermined period of time.

33. The synchronous follow-up circuit in accordance with claim 31, wherein the predetermined period is a period from a time when it is detected that the phase adjustment in the comparison result indicates advance or retardation to a time when the phase-adjusted receive signal having the phase adjusted on the basis of the comparison result is transferred to a demodulator subsection.

34. The synchronous follow-up circuit in accordance with claim 32, wherein the predetermined period is a period from a time when it is detected that the phase adjustment in the comparison result indicates advance or retardation to a time when the phase-adjusted receive signal having the phase adjusted on the basis of the comparison result is transferred to a demodulator subsection.

35. The synchronous follow-up circuit in accordance with claim 31, wherein said phase shift detector comprises a decrementing type of counter, a comparator for detecting zero of a count in said counter, and a masking section for switching an output of the comparison result in response to a zero-detection output from said comparator, said counter being set to a maximum value when it has detected that the phase adjustment in the comparison result indicates advance or retardation, said comparator providing said masking section with a value of 1 until said counter is decremented to zero, or otherwise a value of zero, as the zero-detection output, said masking section outputting the comparison result as it is when the zero-detection output has a value of zero, or masking the comparison result to output the same not indicating the phase adjustment when the zero-detection output has a value of 1.

36. The synchronous follow-up circuit in accordance with claim 32, wherein said phase shift detector comprises a decrementing type of counter, a comparator for detecting zero of a count in said counter, and a masking section for switching an output of the comparison result in response to a zero-detection output from said comparator, said counter being set to a maximum value when it has detected that the phase adjustment in the comparison result indicates advance or retardation, said comparator providing said masking section with a value of 1 until said counter is decremented to zero, or otherwise a value of zero, as the zero-detection output, said masking section outputting the comparison result as it is when the zero-detection output has a value of zero, or masking the comparison result to output the same not indicating the phase adjustment when the zero-detection output has a value of 1.

37. The synchronous follow-up circuit in accordance with claim 33, wherein said phase shift detector comprises a decrementing type of counter, a comparator for detecting zero of a count in said counter, and a masking section for switching an output of the comparison result in response to a zero-detection output from said comparator, said counter being set to a maximum value when it has detected that the phase adjustment in the comparison result indicates advance or retardation, said comparator providing said masking section with a value of 1 until said counter is decremented to zero, or otherwise a value of zero, as the zero-detection output, said masking section outputting the comparison result as it is when the zero-detection output has a value of zero, or masking the comparison result to output the same not indicating the phase adjustment when the zero-detection output has a value of 1.

38. The synchronous follow-up circuit in accordance with claim 1, further comprising a threshold value setting circuit for setting the predetermined threshold value.

39. The synchronous follow-up circuit in accordance with claim 2, further comprising a threshold value setting circuit for setting the predetermined threshold value.

40. The synchronous follow-up circuit in accordance with claim 3, further comprising a threshold value setting circuit for setting the predetermined threshold value.

41. The synchronous follow-up circuit in accordance with claim 4, further comprising a threshold value setting circuit for setting the predetermined threshold value.

42. The synchronous follow-up circuit in accordance with claim 5, further comprising a threshold value setting circuit for setting the predetermined threshold value.

43. The synchronous follow-up circuit in accordance with claim 9, further comprising a threshold value setting circuit for setting the predetermined threshold value.

44. The synchronous follow-up circuit in accordance with claim 14, further comprising a threshold value setting circuit for setting the predetermined threshold value.

45. The synchronous follow-up circuit in accordance with claim 20, further comprising a threshold value setting circuit for setting the predetermined threshold value.

46. The synchronous follow-up circuit in accordance with claim 21, further comprising a threshold value setting circuit for setting the predetermined threshold value.

47. The synchronous follow-up circuit in accordance with claim 22, further comprising a threshold value setting circuit for setting the predetermined threshold value.

48. The synchronous follow-up circuit in accordance with claim 31, further comprising a threshold value setting circuit for setting the predetermined threshold value.

49. The synchronous follow-up circuit in accordance with claim 32, further comprising a threshold value setting circuit for setting the predetermined threshold value.

50. The synchronous follow-up circuit in accordance with claim 33, further comprising a threshold value setting circuit for setting the predetermined threshold value.

51. The synchronous follow-up circuit in accordance with claim 35, further comprising a threshold value setting circuit for setting the predetermined threshold value.

52. The synchronous follow-up circuit in accordance with claim 1, wherein the input received signal is a signal coded with a direct sequence spread spectrum system.

53. The synchronous follow-up circuit in accordance with claim 2, wherein the input received signal is a signal coded with a direct sequence spread spectrum system.

54. The synchronous follow-up circuit in accordance with claim 3, wherein the input received signal is a signal coded with a direct sequence spread spectrum system.

55. The synchronous follow-up circuit in accordance with claim 4, wherein the input received signal is a signal coded with a direct sequence spread spectrum system.

56. The synchronous follow-up circuit in accordance with claim 5, wherein the input received signal is a signal coded with a direct sequence spread spectrum system.

57. The synchronous follow-up circuit in accordance with claim 9, wherein the input received signal is a signal coded with a direct sequence spread spectrum system.

58. The synchronous follow-up circuit in accordance with claim 14, wherein the input received signal is a signal coded with a direct sequence spread spectrum system.

59. The synchronous follow-up circuit in accordance with claim 20, wherein the input received signal is a signal coded with a direct sequence spread spectrum system.

60. The synchronous follow-up circuit in accordance with claim 21, wherein the input received signal is a signal coded with a direct sequence spread spectrum system.

61. The synchronous follow-up circuit in accordance with claim 22, wherein the input received signal is a signal coded with a direct sequence spread spectrum system.

62. The synchronous follow-up circuit in accordance with claim 31, wherein the input received signal is a signal coded with a direct sequence spread spectrum system.

63. The synchronous follow-up circuit in accordance with claim 32, wherein the input received signal is a signal coded with a direct sequence spread spectrum system.

64. The synchronous follow-up circuit in accordance with claim 33, wherein the input received signal is a signal coded with a direct sequence spread spectrum system.

65. The synchronous follow-up circuit in accordance with claim 35, wherein the input received signal is a signal coded with a direct sequence spread spectrum system.

66. The synchronous follow-up circuit in accordance with claim 51, wherein the input received signal is a signal coded with a direct sequence spread spectrum system.

\* \* \* \* \*